3,177,235
NICKEL WERNER COMPLEXES OF RING SUBSTITUTED ALPHA-PHENYLALKYLAMINES
Pierre Marie Joseph Ghislain de Radzitzky d'Ostrowick and Jacques Daniel Victor Hanotier, Brussels, Belgium, assignors to Labofina, Brussels, Belgium
No Drawing. Filed May 22, 1963, Ser. No. 282,516
Claims priority, application Great Britain, June 4, 1962, 21,532/62
6 Claims. (Cl. 260—439)

This invention is a continuation-in-part of application Ser. No. 122,649, filed July 10, 1951, now abandoned, which is a continuation-in-part of Ser. No. 555,957, filed November 30, 1959, now abandoned, the former application having claimed a priority date of July 19, 1960, for British application Ser. No. 25,171/60, and the latter application having claimed priority dates of December 1, 1958, for British application 38,654 and October 7, 1959, for British application 33,987.

This invention relates to novel, substantially water-insoluble compositions of the "Werner complex" type.

The main object of this invention is to provide new chemical compositions of the "Werner complex" type which are insoluble in water at room temperature. Such chemical compositions belong to the family described by the general formula $MA_2X_n$ wherein M is a bivalent metal of atomic number greater than 12, A is a monovalent poly-atomic anion, and X is a primary, phenyl-substituted alkylamine of which the alkyl group contains from 1 to 12 carbon atoms, said substituent phenyl group being itself further substituted by at least one polarizable non-hydrocarbon radical, and $n$ is either 2 or 4.

Another object is to prepare "Werner complexes" with amines which have a negligible ammoniacal odor, and a low vapor pressure.

Still another object is to provide a process for the preparation of the novel "Werner complexes."

Other objects and advantages of the present invention will become apparent upon further study of the specification and appended claims.

For the purpose of simplicity the novel compounds of this invention will be described in two sections, the first section being directed to monosubstituted phenylalkylamines, and the second being directed to polysubstituted phenylalkylamines.

MONOSUBSTITUTED PHENYLALKYLAMINES

According to the present invention there is provided a compound of the general formula $NiA_2X_n$ which is insoluble at room temperature, wherein A is a monovalent triatomic anion which includes one carbon atom only, this carbon atom being directly linked to a nitrogen atom, X is a primary, phenyl-substituted alkylamine of which the alkyl group contains from 1 to 12 carbon atoms, said substituent phenyl group being itself further substituted by one polarizable non-hydrocarbon radical, and $n$ is either 2 or 4.

The triatomic anions A are thiocyanate and selenacyanate or the iso-forms of any of these, the thiocyanate and iso-cyanate being preferred. It is to be understood that no choice is made regarding the form of the anion. By example SCN must be read as a whole and is not restricted specifically to any of the normal or iso form.

The most recent information given in the literature would rather support the idea of an iso configuration wherein Ni is directly linked to the nitrogen atom, but no conclusion is yet possible.

Generally speaking, compounds of the general formula $CoA_2X_n$ are comparable to the ones hereabove described, but their sensitivity to oxidation and the resulting instability seriously restrain their industrial uses.

The present invention particularly comprehends a compound of the general formula $Ni(SCN)_2X_n$ which is insoluble in water at room temperature, in which X is a primary phenyl-substituted alkylamine of which the alkyl group contains from 1 to 12 carbon atoms, the amine radical being attached to the same carbon atom in the alkyl group as is the phenyl group, that is to say, the amine radical being in the alpha position with respect to the phenyl group and the substituent phenyl group itself has as a substituent a polarizable non-hydrocarbon radical, and $n$ is either 2 or 4. In other words, X is an arylalkylamine of the formula—

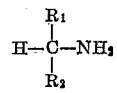

wherein $R_1$ is selected from the group consisting of hydrogen and a primary alkyl group of 1–11 carbon atoms, $R_2$ is a phenyl group being itself substituted with one polarizable radical containing at least one atom other than carbon and hydrogen, said polarizable radical being chemically inert to said arylalkylamine group.

The polarizable, non-hydrocarbon radical is directly linked to the aromatic nucleus in any position with respect to the alkyl group. Suitable polarizable non-hydrocarbon groups are chemically inert to the arylalkylamine radical, i.e., those which do not react with the amine radical either by salt formation or by chemical reaction, do not compete with the coordinating power of the amine group, and do not give rise to any steric hindrance in the complex formation. Preferred polarizable non-hydrocarbon radicals are: halogen, trifluoromethyl-, hydroxy-, nitro-, cyano-, carbamyl-, and sulfamyl. In addition, there are other preferred radicals such as alkoxy and carboalkoxy radicals having from 1 to 5 carbon atoms, and N,N-dialkylamino radicals wherein the alkyl portions contain 1 to 2 carbon atoms.

The most preferred polarizable non-hydrocarbon radicals are the halogens.

Specific examples of the herebefore described class of amines are:

(1) o-Chlorobenzylamine

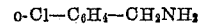

(2) p-Bromobenzylamine

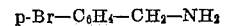

(3) p-Dimethylaminobenzylamine

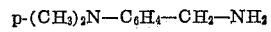

(4) α-(p-Fluorophenyl)ethylamine

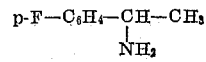

(5) α-(o-Chlorophenyl)ethylamine

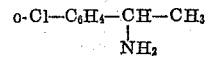

(6) α-(p-Chlorophenyl)ethylamine

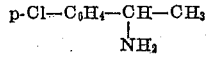

(7) α-(m-Bromophenyl)ethylamine

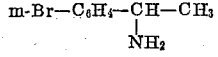

(8) α-(p-Bromophenyl)ethylamine

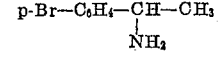

(9) α-(p-Iodophenyl)ethylamine

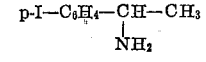

(10) α-(p-Chlorophenyl)propylamine

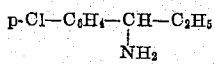

(11) α-(m-Bromophenyl)propylamine

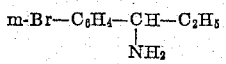

(12) α-(p-Bromophenyl)propylamine

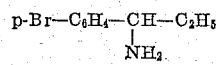

(13) α-(p-Bromophenyl)butylamine

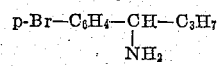

(14) α-(p-Chlorophenyl)amylamine

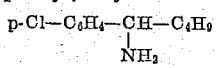

(15) α-(p-Bromophenyl)amylamine

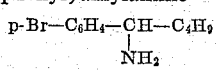

(16) α-(p-Fluorophenyl)isoamylamine

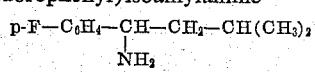

(17) α-(p-Chlorophenyl)isoamylamine

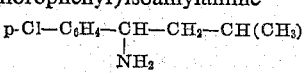

(18) α-(p-Bromophenyl)isoamylamine

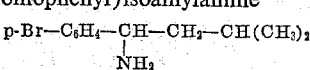

(19) α-(p-Chlorophenyl)hexylamine

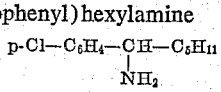

(20) α-(p-Bromophenyl)hexylamine

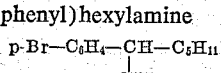

(21) α-(m-Bromophenyl)heptylamine

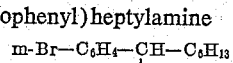

(22) α-(p-Bromophenyl)heptylamine

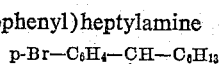

(23) α-(p-Bromophenyl)nonylamine

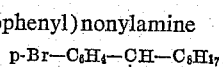

(24) α-(p-Chlorophenyl)dodecylamine

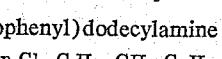

(25) α-(p-Methoxyphenyl)ethylamine

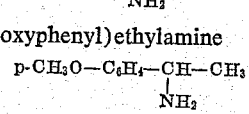

(26) α-(p-Butoxyphenyl)ethylamine

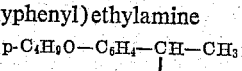

(27) α-(p-Methoxyphenyl)heptylamine

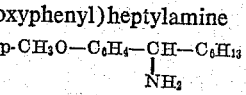

(28) α-(m-Nitrophenyl)ethylamine

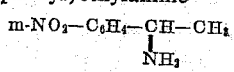

(29) α-(p-Nitrophenyl)ethylamine

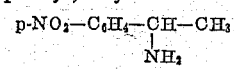

All these amines have little or no ammoniacal odor, differing markedly in this respect from heterocyclic nitrogen bases, which have a strong and persistant nauseous odor, and the amines of this invention also have a low vapor pressure reducing flammability hazard.

The process of this invention comprises preparing a compound of the general formula $MA_2X_n$, wherein a salt of the formula $MA_2$ is contacted with a phenyl-substituted alkylamine (i.e. an aminated base) X. The reaction between the salt and base may advantageously be carried out in an aqueous medium throughout which there is distributed a liquid hydrocarbon phase, the complex $MA_2X_n$ being precipitated.

It is possible to prepare any of the complexes of the present invention in an exclusively aqueous phase, but it has been observed that the presence of hydrocarbons permits easier formation of the complexes and enables them to be obtained in a purer form. This may be partly explained by the lipophilic character of the complexes, which are protected against hydrolysis by a hydrocarbon phase, there being thus avoided the formation of a gel of a metal hydroxide which would impede crystallization.

Inasmuch as the hydrocarbon does not enter into the reaction, it is obvious that a wide variety of hydrocarbons can be used including halogenated derivatives thereof. For example, there may be used such hydrocarbons as pentane, heptane and cyclohexane.

The complexes $MA_2X_n$ are insoluble in water and aliphatic hydrocarbons. They are sparingly soluble in aromatic hydrocarbons at ordinary temperature, depending on their molecular weight. $MA_2X_4$ complexes are generally soluble in organic polar solvents.

These complexes have numerous uses; they can be dissolved in organic polar solvents, thus permitting the introduction of metals into these solutions, in which they can act as oxidation or polymerization catalysts (e.g. in drying oils). They can also be used in solution for impregnating catalytic masses. In solid form, they can be used in heterogeneous catalysis or as clathrating agents.

For example, the separation of pure isomers of xylene is an important problem in the petrochemical industry since each isomer may be oxidized to the corresponding phthalic acid and phthalic acids enter into the fabrication of numerous valuable di- and polyesters. The quality of such products depends on the purity of the starting isomer of xylene. Clathration by the compounds according to the present invention is a means of resolving mixtures of xylenes.

In order that the present invention may be more clearly understood, some preferred examples of the preparation of the new Werner complexes according to the invention will now be described. However, it is to be understood that these examples are not in any way limitative of the broad aspects of the invention as expressed in the specification and appended claims.

*Example 1.—Preparation of $[(Ni(SCN)_2\{\alpha\text{-}(p\text{-}bromophenyl)butylamine\}_4]$*

A solution of 5.70 gms. (0.025 mole) of α-(p-bromophenyl)butylamine in 10 ml. of heptane is slowly added, while stirring, at room temperature, to a binary mixture comprising 5 ml. of heptane and an aqueous solution obtained by dissolving 1.32 gms. (0.0056 mole) of $$NiCl_2 \cdot 6H_2O$$

and 1.11 gms. (0.0114 mole) of KSCN in 3 ml. of distilled water. During this addition, a green amorphous precipitate is formed which, after further stirring, becomes a blue crystalline precipitate of the complex.

This precipitate is filtered off and washed by stirring in a mixture of 10 ml. of heptane and 5 ml. of water. This washing removes any remaining salt or unreacted amine. The precipitate is filtered off again and dried in a thin layer under vacuum at room temperature for two hours. The resulting complex is a blue powder conforming to the formula [Ni(SCN)$_2$(amine)$_4$] as shown by the following analysis:

| Constituents | Percent theoretical | Percent observed |
|---|---|---|
| Nickel (M) | 5.4 | 5.2 |
| Thiocyanate (A) | 10.7 | 10.1 |
| Amine (X) | 83.9 | 82.5 |

| Molar ratios | Theoretical ratios | Observed ratios |
|---|---|---|
| X/M | 4.00 | 4.10 |
| A/M | 2.00 | 1.97 |

The small differences from the theoretical figures which are observed in the analysis of each constituent are probably due to the presence of a small amount of water which is difficult to remove at room temperature.

*Example 2.—Preparation of* [Ni(SCN)$_2$ {α-(p-methoxyphenyl)ethylamine}$_4$]

By following exactly the same procedure but using α-(p-methoxyphenyl)ethylamine instead of α-(p-bromophenyl)butylamine, one obtains a blue powdery complex conforming to the formula [Ni(SCN)$_2$ (amine)$_4$] as shown by the following analysis:

| Constituents | Percent theoretical | Percent observed |
|---|---|---|
| Nickel (M) | 7.5 | 7.4 |
| Thiocyanate (A) | 14.9 | 14.3 |
| Amine (X) | 77.6 | 76.6 |

| Molar ratios | Theoretical ratios | Observed ratios |
|---|---|---|
| X/M | 4.00 | 4.05 |
| A/M | 2.00 | 1.97 |

*Example 3.—Pareparation of* [Ni(SCN)$_2$ {α-(p-chlorophenyl)hexylamine}$_4$]

7.83 g. (0.0370 mole) of α-(p-chlorophenyl)hexylamine is slowly added, while stirring at the ice-bath temperature, to an aqueous solution of Ni(SCN)$_2$ obtained by dissolving 2.20 g. (0.0093 mole) of NiCl$_2$·6H$_2$O and 1.85 g. (0.0190 mole) of KSCN in 20 ml. of distilled water. During this addition, a blue precipitate is formed which, after further stirring during about 15 minutes, is filtered off and washed by stirring in 20 ml. of distilled water. The precipitate is filtered off again and dried in a thin layer under vacuum at room temperature for two hours. The resulting complex is a blue powder conforming to the formula [Ni(SCN)$_2$ (amine)$_4$] as shown by the following analysis:

| Constituents | Percent theoretical | Percent observed |
|---|---|---|
| Nickel (M) | 5.7 | 5.5 |
| Thiocyanate (A) | 11.4 | 10.7 |
| Amine (X) | 82.9 | 82.2 |

| Molar ratios | Theoretical ratios | Observed ratios |
|---|---|---|
| X/M | 4.00 | 4.15 |
| A/M | 2.00 | 1.96 |

*Example 4.—Preparation of* [Ni(SCN)$_2$ {α-(p-chlorophenyl)dodecylamine}$_4$]

By following the same procedure but using α-(p-chlorophenyl)dodecylamine instead of α-(p-chlorophenyl) hexylamine, one obtains first a green amorphous precipitate which after further stirring becomes a blue crystalline precipitate which also conforms to formula [Ni(SCN)$_2$ (amine)$_4$] as shown by the following analysis:

| Constituents | Percent theoretical | Percent observed |
|---|---|---|
| Nickel (M) | 4.3 | 4.1 |
| Thiocyanate (A) | 8.6 | 8.3 |
| Amine (X) | 87.1 | 88.2 |

| Molar ratios | Theoretical ratios | Observed ratios |
|---|---|---|
| X/M | 4.00 | 4.26 |
| A/M | 2.00 | 2.04 |

*Example 5.—Preparation of* [Ni(SCN)$_2${α-(p-bromophenyl)ethylamine}$_2$]

A solution of 3.70 gms. (0.0185 mole) of α-(p-bromophenyl)ethylamine in 5 ml. of chloroform is slowly added, while stirring, at room temperature, to a biphasic mixture comprising 5 ml. of chloroform, 10 ml. of heptane and an aqueous solution obtained by dissolving 2.20 gms. (0.0093 mole) of NiCl$_2$.6H$_2$O and 1.85 gms. (0.019 mole) of KSCN in 10 ml. of distilled water. A crystalline precipitate is readily formed. After stirring for 30 minutes, the resulting precipitate is filtered off and washed twice, first by stirring in a mixture of 10 ml. of heptane and 5 ml. of water, then filtering off and stirring a second time in 10 ml. of chloroform, and filtering off again. The complex is then dried in a thin layer in a vacuum oven at 110° C. for 5 hours. The resulting complex is a pale green powder conforming to the formula

[Ni(SCN)$_2$(amine)$_2$]

as shown by the following analysis:

| Constituents | Percent theoretical | Percent observed |
|---|---|---|
| Nickel (M) | 10.2 | 10.1 |
| Thiocyanate (A) | 20.2 | 20.4 |
| Amine (X) | 69.6 | 69.0 |

| Molar ratios | Theoretical ratios | Observed ratios |
|---|---|---|
| X/M | 2.00 | 2.00 |
| A/M | 2.00 | 2.03 |

It will have been observed from the foregoing examples that the preparation of the complexes containing only two molecules of the amine is identical with the preparation of the complexes containing four such molecules except in that half the quantity of amine is used. The two-base complexes are very stable, permitting quick drying at 100° C. even under vacuum.

The use of chloroform provides the two-base complexes in a purer form because they are generally not soluble in this medium, while the four-base complexes are soluble therein, often with decomposition to the corresponding two-base complexes.

One use of the new Werner complexes will now be described, the

[Ni(SCN)$_2${α-(p-bromophenyl)ethylamide}$_4$]

being prepared and employed to separate a mixture of aromatic hydrocarbons.

A solution of 0.0400 mole of

α-(p-bromophenyl)ethylamine in 25 ml. of a mixture of xylene (in moles percent: O=34.2; m-=30.1; p-=35.7) is slowly added, while stirring at ice bath temperature, to an aqueous solution obtained by dissolving 0.0093 mole of $NiCl_2.6H_2O$ and 0.0190 mole of KSCN in 10 ml. of distilled water. After stirring for 30 minutes, the resulting precipitate is filtered off, washed first with 25 ml. of heptane, then with 25 ml. of pentane, and then dried in air. 7 gms. of this dry precipitate are decomposed by treating it with 20 ml. of 6 N HCl whereupon it separates into an organic phase and an aqueous phase. The organic phase is extracted with 5 ml. of cyclohexane and analyzed by infra-red spectrophotometry. It is found that 9.8% of the dry precipitate consists of xylene isomers with a strong enrichment of the paraisomer (in moles percent: O-=4.8; m-=27.3; p-=67.9), the remainder consisting essentially of the complex $[Ni(SCN)_2(amine)_4]$.

As has been shown in the preceding examples, it is more convenient to use as the source of metal and anion two different salts containing the respective ions. On addition of the primary phenyl-substituted alkylamine double decomposition occurs, the sparingly soluble complex being continuously precipitated by displacement of the equilibrium:

$NiCl_2 + KSCN + 4X(X:aminated\ base) \rightarrow Ni(SCN)_2X_4 2KCl$

For complexes conforming to the general formula $MA_2X_n$ (M=metal; A=anion; X=amine), the theoretical values of the molar ratios A:M and X:M are 2 and 4 respectively when n=4, and 2 and 2, respectively, when n=2.

Functional analysis of the compounds described herein has revealed that the observed ratios are very close to the theoretical values, leaving no doubt about their composition.

The solubility of the new complexes has been evaluated in methanol, and may be increased by adding some of the corresponding amines.

Several examples of complexes according to the invention are given in the following tables but these examples are not intended to be limiting.

TABLE I

| No. | Complex $[Ni(SCN)_2X_n]$ | Molar ratios X/Ni | Molar ratios NCS/Ni |
|---|---|---|---|
| 1 | $[Ni(SCN)_2(o\text{-chlorobenzylamine})_4]$ | 3.95 | 1.91 |
| 2 | $[Ni(SCN)_2(p\text{-dimethylaminobenzylamine})_4]$ | 4.04 | 2.06 |
| 3 | $[Ni(SCN)_2(p\text{-bromobenzylamine})_4]$ | 4.01 | 2.01 |
| 4 | $[Ni(SCN)_2\{\alpha\text{-}(p\text{-fluorophenyl})ethylamine\}_4]$ | 3.65 | 2.21 |
| 5 | $[Ni(SCN)_2\{\alpha\text{-}(o\text{-chlorophenyl})ethylamine\}_4]$ | 3.89 | 2.00 |
| 6 | $[Ni(SCN)_2\{\alpha\text{-}(p\text{-chlorophenyl})ethylamine\}_4]$ | 4.13 | 2.00 |
| 7 | $[Ni(SCN)_2\{\alpha\text{-}(m\text{-bromophenyl})ethylamine\}_4]$ | 3.85 | 1.93 |
| 8 | $[Ni(SCN)_2\{\alpha\text{-}(m\text{-bromophenyl})ethylamine\}_2]$ | 1.93 | 1.98 |
| 9 | $[Ni(SCN)_2\{\alpha\text{-}(p\text{-bromophenyl})ethylamine\}_4]$ | 3.95 | 2.00 |
| 10 | $[Ni(SCN)_2\{\alpha\text{-}(p\text{-bromophenyl})ethylamine\}_2]$ | 2.00 | 2.03 |
| 11 | $[Ni(SCN)_2\{\alpha\text{-}(p\text{-iodophenyl})ethylamine\}_4]$ | 3.91 | 1.97 |
| 12 | $[Ni(SCN)_2\{\alpha\text{-}(m\text{-bromophenyl})propylamine\}_4]$ | 4.09 | 1.96 |
| 13 | $[Ni(SCN)_2\{\alpha\text{-}(p\text{-bromophenyl})butylamine\}_4]$ | 4.03 | 2.01 |
| 14 | $[Ni(SCN)_2\{\alpha\text{-}(p\text{-bromophenyl})butylamine\}_2]$ | 2.13 | 1.98 |
| 15 | $[Ni(SCN)_2\{\alpha\text{-}(p\text{-chlorophenyl})amylamine\}_4]$ | 4.30 | 1.97 |
| 16 | $[Ni(SCN)_2\{\alpha\text{-}(p\text{-chlorophenyl})amylamine\}_2]$ | 2.12 | 1.96 |
| 17 | $[Ni(SCN)_2\{\alpha\text{-}(p\text{-chlorophenyl})hexylamine\}_4]$ | 4.15 | 1.96 |
| 18 | $[Ni(SCN)_2\{\alpha\text{-}(p\text{-chlorophenyl})hexylamine\}_2]$ | 1.99 | 1.96 |
| 19 | $[Ni(SCN)_2\{\alpha\text{-}(p\text{-bromophenyl})nonylamine\}_4]$ | 4.47 | 1.95 |
| 20 | $[Ni(SCN)_2\{\alpha\text{-}(p\text{-chlorophenyl})dodecylamine\}_4]$ | 4.26 | 2.04 |
| 21 | $[Ni(SCN)_2\{\alpha\text{-}(p\text{-methoxyphenyl})ethylamine\}_4]$ | 4.05 | 1.97 |
| 22 | $[Ni(SCN)_2\{\alpha\text{-}(p\text{-methoxyphenyl})ethylamine\}_2]$ | 2.01 | 2.03 |
| 23 | $[Ni(SCN)_2\{\alpha\text{-}(m\text{-nitrophenyl})ethylamine\}_4]$ | 4.02 | 2.03 |
| 24 | $[Ni(SCN)_2\{\alpha\text{-}(p\text{-nitrophenyl})ethylamine\}_4]$ | 3.64 | 2.08 |

TABLE II

| No. | Complex $[Ni(SCN)_2X_n]$ | Color | Solubility in methanol |
|---|---|---|---|
| 1 | $[Ni(SCN)_2(o\text{-chlorobenzylamine})_4]$ | Pale blue | Very slightly soluble. |
| 2 | $[Ni(SCN)_2(p\text{-bromobenzylamine})_4]$ | Purple | Slightly soluble. |
| 3 | $[Ni(SCN)_2(p\text{-dimethylaminobenzylamine})_4]$ | Blue | Insoluble. |
| 4 | $[Ni(SCN)_2\{\alpha\text{-}(p\text{-fluorophenyl})ethylamine\}_4]$ | do | Very soluble. |
| 5 | $[Ni(SCN)_2\{\alpha\text{-}(o\text{-chlorophenyl})ethylamine\}_4]$ | do | Soluble. |
| 6 | $[Ni(SCN)_2\{\alpha\text{-}(p\text{-chlorophenyl})ethylamine\}_4]$ | do | Do. |
| 7 | $[Ni(SCN)_2\{\alpha\text{-}(m\text{-bromophenyl})ethylamine\}_4]$ | do | Very soluble. |
| 8 | $[Ni(SCN)_2\{\alpha\text{-}(m\text{-bromophenyl})ethylamine\}_2]$ | Pale green | Soluble. |
| 9 | $[Ni(SCN)_2\{\alpha\text{-}(p\text{-bromophenyl})ethylamine\}_4]$ | Blue | Do. |
| 10 | $[Ni(SCN)_2\{\alpha\text{-}(p\text{-bromophenyl})ethylamine\}_2]$ | Pale green | Do. |
| 11 | $[Ni(SCN)_2\{\alpha\text{-}(p\text{-iodophenyl})ethylamine\}_4]$ | Blue | Slightly soluble. |
| 12 | $[Ni(SCN)_2\{\alpha\text{-}(p\text{-chlorophenyl})propylamine\}_4]$ | do | Very soluble. |
| 13 | $[Ni(SCN)_2\{\alpha\text{-}(m\text{-bromophenyl})propylamine\}_4]$ | do | Do. |
| 14 | $[Ni(SCN)_2\{\alpha\text{-}(p\text{-bromophenyl})butylamine\}_4]$ | do | Do. |
| 15 | $[Ni(SCN)_2\{\alpha\text{-}(p\text{-bromophenyl})butylamine\}_2]$ | Green | Do. |
| 16 | $[Ni(SCN)_2\{\alpha\text{-}(p\text{-chlorophenyl})amylamine\}_4]$ | Blue | Do. |
| 17 | $[Ni(SCN)_2\{\alpha\text{-}(p\text{-chlorophenyl})amylamine\}_2]$ | Pale green | Do. |
| 18 | $[Ni(SCN)_2\{\alpha\text{-}(p\text{-bromophenyl})amylamine\}_4]$ | Blue | Do. |
| 19 | $[Ni(SCN)_2\{\alpha\text{-}(p\text{-bromophenyl})isoamylamine\}_4]$ | do | Soluble. |
| 20 | $[Ni(SCN)_2\{\alpha\text{-}(p\text{-bromophenyl})isoamylamine\}_2]$ | Green | Very soluble. |
| 21 | $[Ni(SCN)_2\{\alpha\text{-}(p\text{-chlorophenyl})hexylamine\}_4]$ | Blue | Do. |
| 22 | $[Ni(SCN)_2\{\alpha\text{-}(p\text{-chlorophenyl})hexylamine\}_2]$ | Pale green | Soluble. |
| 23 | $[Ni(SCN)_2\{\alpha\text{-}(m\text{-bromophenyl})heptylamine\}_4]$ | Blue | Very soluble. |
| 24 | $[Ni(SCN)_2\{\alpha\text{-}(p\text{-bromophenyl})nonylamine\}_4]$ | do | Soluble. |
| 25 | $[Ni(SCN)_2\{\alpha\text{-})p\text{-methoxyphenyl})ethylamine\}_4]$ | do | Very soluble. |
| 26 | $[Ni(SCN)_2\{\alpha\text{-}(p\text{-methoxyphenyl})ethylamine\}_2]$ | Pale green | Soluble. |
| 27 | $[Ni(SCN)_2\{\alpha\text{-}(m\text{-nitrophenyl})ethylamine\}_4]$ | do | Slightly soluble. |
| 28 | $[Ni(SCN)_2\{\alpha\text{-}(p\text{-nitrophenyl})ethylamine\}_4]$ | Green | Soluble. |
| 29 | $[Ni(SCN)_2\{\alpha\text{-}(p\text{-chlorophenyl})dodecylamine\}_4]$ | Blue | Do. |

The new and unobvious advantages of the compounds of this invention as compared to other Werner complexes are:

Absence of ammoniacal odor
Insolubility in water
Low flammability hazard
Unexpected selectivities in clathration

POLYSUBSTITUTED PHENYLALKYLAMINES

According to this aspect of the invention, new complexes of the Werner type are obtained from nickel thiocyanate or nickel selenocyanate and an aminated base of the alpha-arylalkylamine type, the aryl group of which is a benzene nucleus further substituted by 2 halogens on the 3 and 4 positions.

According to the invention there is provided a Werner complex of general formula $NiA_2X_n$ which is insoluble or sparingly soluble in water at room temperature, wherein A is either a thiocyanate or selenocyanate anion, X is an alpha-arylalkylamine in which the aryl group is a phenyl group carrying 2 further halogen substituents on the 3 and 4 positions, the alkyl group being a paraffinic radical having no side chain on the alpha and beta carbon atoms, $n$ is either 2 or 4. Preferably A is a thiocyanate anion.

In other words, this aspect of the invention comprises a compound of the general formula $Ni(SCN)_2X_n$ which is insoluble or sparingly soluble in water at room temperature, wherein X is an alpha-arylalkylamine having the general formula:

$$H-\underset{R_2}{\overset{R_1}{\underset{|}{\overset{|}{C}}}}-NH_2$$

where $R_1$ is either a hydrogen or a primary alkyl group and $R_2$ is a 3,4-dihalophenyl group, $n$ is either 2 or 4.

The halogen substituents are conveniently identical and may be for example chlorine, bromine, iodine or fluorine atoms. Preferably both substituents are chlorine atoms.

The number of carbon atoms in the primary alkyl group $R_1$ may vary within rather broad limits. Nevertheless a probability of getting steric effect impeding the formation of the complex will be met with the higher alkyl groups. Also the solubility and the physical aspect of the complex depend on the length of the chain and the complex will get less and less insoluble in hydrocarbons and more and more waxy as the length of the chain increases.

When used as clathrating agents, the Werner complexes as defined must remain solid and not dissolve to a large extent in the aromatic compounds to be clathrated. A preferred embodiment of this invention will so comprehend insoluble or slightly soluble complexes in aromatic hydrocarbons at room temperature.

It is thus preferred that there be 1 to about 10, even more preferably 1 to 6 carbon atoms in the alkyl group $R_1$.

Amines, the benzenic ring of which carries one of the two halogen substituents in position 2 or 6, are less suitable for forming complexes wherein $n$ is 4.

Such complexes when they are obtained are also less active clathrating agents.

Specific but not limitative examples of the hereinbefore described class of aminated bases are:

| | B.P., °C./mm. | M.P. HCl salt, °C. | $n_D^4$ |
|---|---|---|---|
| α-(3,4-dichlorophenyl)ethylamine 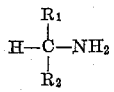 | 140-3/15 | 195-6 | 1.5602 |
| α-(3,4,-dichlorophenyl)butylamine <br> NH₂ <br> H—C—C₃H₇ <br> ⟨Cl⟩ <br> Cl | 165-8/15 | 332-3 | 1.5459 |
| α-(3,4-dichlorophenyl)heptylamine <br> NH₂ <br> H—C—C₆H₁₃ <br> ⟨Cl⟩ <br> Cl | 169-70/5 | 276-7 | 1.5295 |
| α-(3,4-dibromophenyl)ethylamine <br> NH₂ <br> H—C—CH₃ <br> ⟨Br⟩ <br> Br | 133-5/4 | 236-7 | 1.6057 |

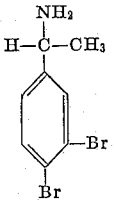

All amines hereinabove described have little or no ammoniacal odor, thus differing markedly from heterocyclic nitrogen bases which exhibit strong and persistant nauseous smelling. In addition, all amines hereinafter described have a very low vapor pressure thus reducing fire risks, which risks are also reduced because of the presence of the two halogen substituents in the amines used.

All amines hereinabove described are also new chemical compounds. They are easily prepared by reductive amination of the corresponding ketones, for instance by heating with ammonium formate (Leuckart reaction).

It is to be noted that no choice is made regarding the form of the anion SCN. The formula SCN must be taken as a whole and not be restricted specifically to any of the normal or iso forms.

Replacement of SCN by SeCN gives also complexes having approximately the same general properties. Nevertheless selenium complexes are much less attractive than SCN because they are not readily available.

The complexes following the invention have numerous uses. They can be dissolved in organic polar solvents, thus permitting the introduction of nickel into these solutions in which they can act as oxidation or polymerization catalysts.

They can also be used in solution for impregnating catalytic masses.

In solid form they can be used as heterogenous catalysts or as clathrating agents.

As clathrating agents, they permit resolution of mixtures which are difficult to resolve by conventional methods, particularly mixtures of aromatic isomers.

In such uses they show unexpected properties, by example for the treatment of aromatic molecules having at least one bulky group for which they show unexpected selectivities and capacities.

They have also the advantage of being less soluble and less dissociated in aromatic hydrocarbons than the similar complexes not having 2 halogen substituents on the benzene ring. This is particularly noticeable when the length of the alkyl chain $R_1$ increases.

When compared to complexes of the same general formula but using other types of arylalkylamines, the complexes of this invention exhibit a marked and highly unexpected superiority in clathrating separation processes.

The preparation of the complexes according to the invention will now be described with reference to the following example.

*Example 6.—Preparation of* [Ni (SCN)₂ {α-(3,4,-dichlorophenyl)ethylamine}₄]

A solution of 0.0250 mole of α-(3,4-dichlorophenyl) ethylamine in 6 ml. of heptane is slowly added, while stirring at room temperature, to an aqueous solution obtained by dissolving 0.0056 mole of NiCl₂.6H₂O and 0.0114 mole of KSCN in 6 ml. of distilled water. After stirring for 30 minutes, the resulting precipitate is then separated by filtration, washed with a mixture of 6 cc. of heptane and 6 cc. of water and dried for 2 hours under vacuum at room temperature.

The composition of the resulting 4 base complex is shown in Table III.

The other complexes in accordance with the invention are prepared in a similar manner.

The two-base complexes are obtained by using stoichiometric quantities of reactants, i.e. $2x$ moles of amine, $x$ moles $NiCl_2.6H_2O$, $2x$ moles of KCNS, a slight deficit of amine being advisable. Furthermore, the two base complexes are easier to obtain in a pure form when an equal quantity of chloroform is added to heptane either for the formation and for the washing of the complexes. Those complexes are then dried for 2 hours under vacuum at 100° C.

For complexes conforming to the general formula $Ni(SCN)_2X_n$ the theoretical values of the molar ratio SCN/Ni and X/Ni are respectively 2 and 4 when $n$ is 4 and 2 when $n$ is 2.

For complexes here described we have found, by functional analysis, ratios very close to theoretical values, leaving no doubt about the composition of the complexes.

The solubility of the new complexes in methanol has been determined. This solubility may be increased by adding to the methanol some of the corresponding amine.

Para-diisopropylbenzene is a valuable starting material for the synthesis of terephthalic acid.

The separation of para-diisopropylbenzene out of its isomers by clathration with the new Werner complexes will be described with reference to the following specific case.

For clathrating a mixture of diisopropylbenzenes (in mole percent: o-: 12; m-: 29; p-: 59) by

[Ni(SCN)$_2${α-(3,4-dichlorophenyl)butylamine}$_4$]

a solution of 0.0250 mole of α-(3,4-dichlorophenyl) butylamine in 15 ml. of the mixture of diisopropylbenzenes is slowly added, while stirring at the ice bath temperature, to an aqueous solution obtained by dissolving 0.0056 mole of $NiCl_2.6H_2O$ and 0.0114 mole of KSCN in 6 ml. of distilled water. After stirring for 30 minutes the resulting precipitate is then separated by filtration, washed once with 20 ml. of heptane and once with 20 ml. of pentane, and dried in air. 3 g. of the dry precipitate are decomposed by 10 ml. of 50% acetic acid. After decomposition, the acetic acid is diluted by 20 ml. of distilled water and the clathrated hydrocarbons are extracted by 10 ml. of p-xylene and analyzed by vapor phase chromatography. It is thus found that 14.3% of the solid obtained consist of diisopropylbenzene isomers with a strong enrichment of

TABLE III

|  | Color | Molar ratios | | Solubility in methanol |
|---|---|---|---|---|
|  |  | X/Ni | SCN/Ni |  |
| [Ni(SCN)$_2${α-(3,4-dichlorophenyl)ethylamine}$_4$] | Greenish blue | 4.02 | 2.03 | Very soluble. |
| [Ni(SCN)$_2${α-(3,4-dichlorophenyl)butylamine}$_4$] | Pale blue | 4.00 | 1.97 | Do. |
| [Ni(SCN)$_2${α-(3,4-dichlorophenyl)heptylamine}$_4$] | Blue | 4.06 | 2.00 | Do. |
| [Ni(SCN)$_2${α-(3,4-dichlorophenyl)ethylamine}$_2$] | Pale green | 2.03 | 2.03 | Soluble. |
| [Ni(SCN)$_2${α-(3,4-dibromophenyl)ethylamine}$_2$] | do | 1.94 | 1.94 | Slightly soluble. |
| [Ni(SCN)$_2${α-(3,4-dibromophenyl)ethylamine}$_4$] | Pale blue | 4.10 | 1.94 | Soluble. |

Because of their reduced solubility in aromatic hydrocarbons the new complexes can be used as clathrating agents in large volumes of said hydrocarbons without loss of said complexes and without any significant contamination of said hydrocarbons.

Some of the new complexes are particularly interesting for the separation of para-isomers of bulky aromatic molecules which were either difficult or impossible to separate by clathration with the previously described complexes.

Para-diisopropylbenzene in admixture with its isomers is found as a by-product of the synthesis of cumene.

the para-isomer (in mole percent: o-: 3; m-: 11; p-: 86). The remainder consists essentially of the complex

[Ni(SCN)$_2$(amine)$_4$]

Other resolutions of mixture of aromatic compounds are realized by the same procedure employing the same complex or the other complexes according to the invention; the results of such clathrations are summarized together with the preceding results in Table IV, this shows that not only aromatics carrying bulky alkyl substituents but also some others such as methylnaphthalenes are clathrated with a very good selectivity.

TABLE IV

| Aminated base of the 4-base complex | Composition of the feed (mole percent) | Composition of the clathrated mixture (mole percent) | Clathrated compounds in the clathrate (weight percent) |
|---|---|---|---|
| α-(3,4-dichlorophenyl)ethylamine | Cymenes: o = 33, m = 34, p = 33 | 35, 33, 32 | 20.3 |
| α-(3,4-dichlorophenyl)butylamine | Ethylisopropyl benzenes: o = 24, m = 20, p = 56 | 12, 13, 75 | 23.8 |
|  | Diisopropyl benzenes: o = 12, m = 29, p = 59 | 3, 11, 86 | 14.3 |
|  | Cyclohexyltoluenes: o = 5, m = 16, p = 79 | 5, 8, 87 | 20.9 |
| α-(3,4-dichlorophenyl)heptylamine | Cymenes: o = 33, m = 34, p = 33 | 36, 31, 33 | 11.0 |
|  | Methylnaphthalenes: 1- = 57, 2- = 43 | 91, 9 | 12.1 |
| α-(3,4-dibromophenyl)ethylamine | Cymenes: o = 33, m = 34, p = 33 | 41, 30, 29 | 15.2 |
|  | Cyclohexyltoluenes: o = 44, m = 24, p = 32 | 49, 23, 28 | 24.4 |

For additional details regarding clathration techniques, attention is invited to our application directed specifically to clathration processes using the novel complexes of this invention, said application filed simultaneously with the present application.

From the foregoing description, one skilled in the art can easily ascertain the essential characteristics of this invention and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A Werner complex of general formula $Ni(CNS)_2 X_n$ wherein $n$ is an even number from 1 to 5 and X is a substituted phenylalkylamine having the formula:

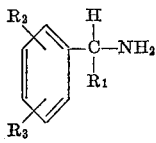

in which $R_1$ is selected from the group consisting of hydrogen and primary alkyl radicals of 1 to 11 carbon atoms, $R_2$ is selected from the group consisting of hydrogen and halogen, $R_3$ is selected from the group consisting of halogen, nitro, alkoxy containing 1 to 5 carbon atoms, and N,N-dialkylamino wherein the alkyl portions contain 1 to 2 carbon atoms, the radical $R_2$ being hydrogen when the radical $R_3$ is other than halogen.

2. A Werner complex following claim 1 in which the radicals $R_2$ and $R_3$ are at any of the positions 3 and 4 of the phenyl radical.

3. A Werner complex following claim 1 in which the radicals $R_2$ and $R_3$ are at any of the positions 3 and 4 of the phenyl radical and in which $R_1$ is a primary alkyl radical of 1 to 6 carbon atoms, $R_2$ is hydrogen and $R_3$ is selected from the group consisting of halogen, nitro, alkoxy containing 1 to 5 carbon atoms, and N,N-dialkylamino wherein the alkyl portions contain 1 to 5 carbon atoms.

4. A Werner complex following claim 3 in which $R_3$ is halogen.

5. A Werner complex following claim 1 in which $R_1$ is a primary alkyl radical of 1 to 6 carbon atoms, $R_2$ and $R_3$ are halogens.

6. A Werner complex following claim 1 in which the amine X is selected from the group consisting of:

o-chlorobenzylamine
p-bromobenzylamine
p-dimethylaminobenzylamine
alpha-(p-fluorophenyl)ethylamine
alpha-(o-chlorophenyl)ethylamine
alpha-(m-chlorophenyl)ethylamine
alpha-(p-chlorophenyl)ethylamine
alpha-(m-bromophenyl)ethylamine
alpha-(p-bromophenyl)ethylamine
alpha-(p-iodophenyl)ethylamine
alpha-(p-chlorophenyl)propylamine
alpha-(m-bromophenyl)propylamine
alpha-(p-bromophenyl)butylamine
alpha-(p-chlorophenyl)amylamine
alpha-(p-bromophenyl)amylamine
alpha-(p-bromophenyl)isoamylamine
alpha-(p-chlorophenyl)hexylamine
alpha-(p-fluorophenyl)heptylamine
alpha-(m-bromophenyl)heptylamine
alpha-(p-bromophenyl)nonylamine
alpha-(p-chlorophenyl)dodecylamine
alpha-(p-methoxyphenyl)ethylamine
alpha-(m-nitrophenyl)ethylamine
alpha-(3,4-dichlorophenyl)ethylamine
alpha-(3,4-dibromophenyl)ethylamine
alpha-(3,4-dichlorophenyl)butylamine
alpha-(3,4-dichlorophenyl)heptylamine

References Cited by the Examiner

UNITED STATES PATENTS 2,798,103   7/57   Schaeffer et al. _____ 260—439

OTHER REFERENCES

Helvetica Chimica Acta, vol. 39, page 2107 (1956).
Sidgwick: Chemical Elements and Their Compounds, vol. II, page 1400 (1950).

TOBIAS E. LEVOW, *Primary Examiner.*